United States Patent
Zidek

(10) Patent No.: US 11,161,501 B2
(45) Date of Patent: Nov. 2, 2021

(54) SYSTEM AND METHOD FOR OPTIMIZING A PATH FOR OBSTACLE EVASION FOR A VEHICLE

(71) Applicant: Toyota Research Institute, Inc., Los Altos, CA (US)

(72) Inventor: Robert A. E. Zidek, Ann Arbor, MI (US)

(73) Assignee: Toyota Research Insititute, Inc., Los Altos, CA (US)

( * ) Notice: Subject to any disclaimer, the term of this patent is extended or adjusted under 35 U.S.C. 154(b) by 239 days.

(21) Appl. No.: 16/241,027

(22) Filed: Jan. 7, 2019

(65) Prior Publication Data
US 2020/0216061 A1   Jul. 9, 2020

(51) Int. Cl.
 *B60W 30/09* (2012.01)
 *B60W 30/095* (2012.01)
 *G05D 1/02* (2020.01)
 *G08G 1/16* (2006.01)

(52) U.S. Cl.
CPC ........ *B60W 30/09* (2013.01); *B60W 30/0956* (2013.01); *G05D 1/0214* (2013.01); *G05D 1/0274* (2013.01); *G08G 1/165* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 8,060,306 B2* | 11/2011 | Puhalla | ............... | B60W 30/095 701/301 |
| 8,849,515 B2* | 9/2014 | Moshchuk | ............ | G08G 1/167 701/42 |
| 9,229,453 B1* | 1/2016 | Lee | ........................ | B60W 30/12 |
| 9,318,023 B2* | 4/2016 | Moshchuk | ......... | B62D 15/0265 |
| 9,523,984 B1* | 12/2016 | Herbach | ............. | G05D 1/0088 |
| 10,156,850 B1* | 12/2018 | Ansari | ................ | B60W 30/095 |
| 11,034,348 B2* | 6/2021 | Ding | .................... | G05D 1/0088 |
| 2003/0101029 A1 | 5/2003 | Drumheller | | |
| 2013/0054128 A1* | 2/2013 | Moshchuk | ............ | B60W 10/18 701/301 |

(Continued)

OTHER PUBLICATIONS

Dolgov et al., "Path Planning for Autonomous Vehicles in Unknown Semi-Structured Environments," The International Journal of Robotics Research, 2010 (Abstract).

*Primary Examiner* — Jeff A Burke
*Assistant Examiner* — Jerrod Davis
(74) *Attorney, Agent, or Firm* — Christopher G. Darrow; Darrow Mustafa PC

(57) ABSTRACT

In one embodiment, example systems and methods relate to generating an optimal path for a vehicle to avoid an obstacle. As the vehicle travels on a road segment, a polyline representing a path of the vehicle is generated. The polyline may include a plurality of nodes, and each node may have a set of coordinates with respect to the polyline. The vehicle uses sensors to detect one or more obstacles on the road, and lane boundaries of the road. The vehicle uses these obstacles and lane boundaries to calculate lateral constraints for the polyline. The vehicle then uses the lateral constraints and a quadratic program to optimize the polyline. The optimized polyline may be used to determine the optimal path for the vehicle that avoids the one or more obstacles.

21 Claims, 7 Drawing Sheets

(56) References Cited

U.S. PATENT DOCUMENTS

| | | |
|---|---|---|
| 2015/0284010 A1 | 10/2015 | Beardsley et al. |
| 2018/0141544 A1* | 5/2018 | Xiao ..................... B60W 10/18 |
| 2018/0164822 A1* | 6/2018 | Chu ..................... G05D 1/0248 |
| 2018/0164827 A1 | 6/2018 | Chu et al. |
| 2019/0250617 A1* | 8/2019 | Ford ................. B60W 50/0097 |
| 2020/0003564 A1* | 1/2020 | Zhang ..................... G01C 21/32 |
| 2020/0142417 A1* | 5/2020 | Hudecek ........... B60W 30/0956 |

* cited by examiner

SYSTEM AND METHOD FOR OPTIMIZING A PATH FOR OBSTACLE EVASION FOR A VEHICLE

TECHNICAL FIELD

The subject matter described herein relates, in general, to a system and method for optimizing a path for a vehicle, and in particular, to determining lateral path limits for a polyline based on road obstacles and lane boundaries, and for optimizing the polyline using the road obstacles and lane boundaries and a quadratic program. The optimized polyline may be used as an optimized path for the vehicle.

BACKGROUND

Path generation is the process used by autonomous and semi-autonomous vehicles to generate or select a path for the vehicle to follow. Typically, a vehicle uses sensors to identify a position in a road lane such as a centerline position, and generates a path that follows the centerline position. The vehicle may continuously update the path as the vehicle travels in the road segment.

As the vehicle travels, the vehicle may detect one or more obstacles on the road segment. These obstacles may include trees, other vehicles, rocks, potholes, animals, and pedestrians. When such obstacles are detected, the vehicle must generate a new path that avoids the detected obstacles.

While generating a new path that avoids detected obstacles is known, generating an optimal path that avoids the obstacles is much more difficult. As described herein, an optimal path may be the path through a road segment that avoids the obstacles, stays as close to the original path as possible, and also maximizes the comfort of the vehicle occupants. For example, the optimal path should avoid sharp or sudden turns that may jostle or frighten the vehicle occupants. Because the vehicle may be traveling on the road segment at a high rate of speed and new obstacles may be continually entering and exiting from the path of the vehicle, it is important that the vehicle be able to quickly and efficiently generate an optimal path to avoid occupant discomfort and possible collision with an obstacle.

SUMMARY

In one embodiment, example systems and methods relate to generating an optimal path for a vehicle to avoid one or more obstacles. As the vehicle travels on a road segment, a polyline representing a path of the vehicle is generated. The polyline may include a plurality of nodes, and each node may have a set of coordinates with respect to the polyline. The vehicle uses sensors to detect one or more obstacles on the road, and lane boundaries of the road. The vehicle uses these obstacles and lane boundaries to calculate lateral constraints for the polyline. The vehicle then uses the lateral constraints and a quadratic program to optimize the polyline. The optimized polyline may be used to determine the optimal path for the vehicle that avoids the obstacles.

In one embodiment, an optimization system for optimizing a polyline for obstacle evasion for a vehicle is disclosed. The optimization system includes one or more processors and a memory communicably coupled to the one or more processors. The memory stores a polyline generating module including instructions that when executed by the one or more processors cause the one or more processors to generate a polyline along a road segment, wherein the polyline comprises a plurality of nodes wherein each node includes an x-coordinate and a y-coordinate using a reference frame of the polyline. The memory further stores an obstacle module including instructions that when executed by the one or more processors cause the one or more processors to: detect one or more obstacles in the road segment; and project the polyline into the road segment with the detected one or more obstacles to determine one or more lateral constraints for an output path. The memory further stores an optimization module including instructions that when executed by the one or more processors cause the one or more processors to: for each point of a plurality of points of the polyline, determine an optimized y-coordinate for the point based on the one or more lateral constraints, wherein each point includes an x-coordinate and a y-coordinate using the reference frame of the polyline; and generate an optimized polyline for the vehicle using the optimized y-coordinate and x-coordinate for each point.

In one embodiment, a method for generating an optimized polyline for obstacle evasion for a vehicle is disclosed. The method includes: receiving a polyline for a road segment, wherein the polyline comprises a plurality of nodes wherein each node includes an x-coordinate and a y-coordinate using a reference frame of the polyline; receiving indications of one or more obstacles in the road segment; receiving one or more lateral constraints; for each point of a plurality of points of the polyline, determining an optimized y-coordinate for the point based on the one or more lateral constraints, wherein each point includes an x-coordinate and a y-coordinate using the reference frame of the polyline; and generating an optimized polyline for the vehicle using the optimized y-coordinate and x-coordinate for each point.

In one embodiment, a non-transitory computer-readable medium for generating an optimized polyline for a vehicle that avoids obstacles is disclosed. The non-transitory computer-readable medium includes instructions that when executed by one or more processors cause the one or more processors to perform one or more functions. The instructions include instructions to receive a polyline for a road segment, wherein the polyline comprises a plurality of nodes, and further wherein each node includes an x-coordinate and a y-coordinate using a reference frame of the polyline. The instructions include instructions to detect one or more obstacles in the road segment. The instructions include instructions to detect one or more lane boundaries in the road segment. The instructions include instructions to project the polyline into the road segment with the detected one or more obstacles to determine one or more lateral constraints for an output path. The instructions include instructions to, for each point of a plurality of points of the polyline, determine an optimized y-coordinate for the point based on the one or more lateral constraints, wherein each point includes an x-coordinate and a y-coordinate using the reference frame of the polyline. The instructions include instructions to generate an optimized polyline for the vehicle using the optimized y-coordinate and x-coordinate for each point.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with optimizing vehicle paths to avoid obstacles are disclosed. As described previously, a vehicle, such as an autonomous vehicle, typically follows a path on a road segment that roughly corresponds to the centerline of a lane of the road segment. However, as the vehicle travels one or more obstacles may enter the road segment, forcing the vehicle to avoid the obstacles. The obstacles may include potholes, debris, pedestrians, animals, other vehicles, etc.

Some autonomous vehicles may try to avoid the obstacles in the road segment by turning or breaking to avoid the obstacles, and then later returning to the original path once the obstacles have been avoided. While the vehicle may successfully avoid the obstacles in the path, there are drawbacks associated with the approach.

One such drawback is that the path the vehicle traveled in the road segment to avoid the obstacles is unlikely to have been the optimal path that the vehicle could have traveled in the road segment. The optimal path in the road segment is the path that avoids the obstacles in the road segment and is the most similar to the original path (i.e., the centerline path). In some embodiments, the optimal path also avoids driving maneuvers that may cause occupant discomfort such as sudden braking and sharp turning.

Accordingly, to avoid obstacles using an optimal path, the system described herein determines a polyline that includes a plurality of nodes that corresponds to the current path of the vehicle. This polyline is projected into the road surface including obstacles. Lateral constraints for the vehicle are determined based on the edges of the obstacles and lane boundaries. The lateral constrains and coordinates of the polyline are used by a quadratic program (a special optimization problem) that outputs new coordinates for all of the polyline nodes. The updated polyline may then be used as the optimal path for the vehicle. The quadratic program is guaranteed to result in an optimal path that satisfies the lateral constraints while maximizing occupant comfort.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Figure 1:
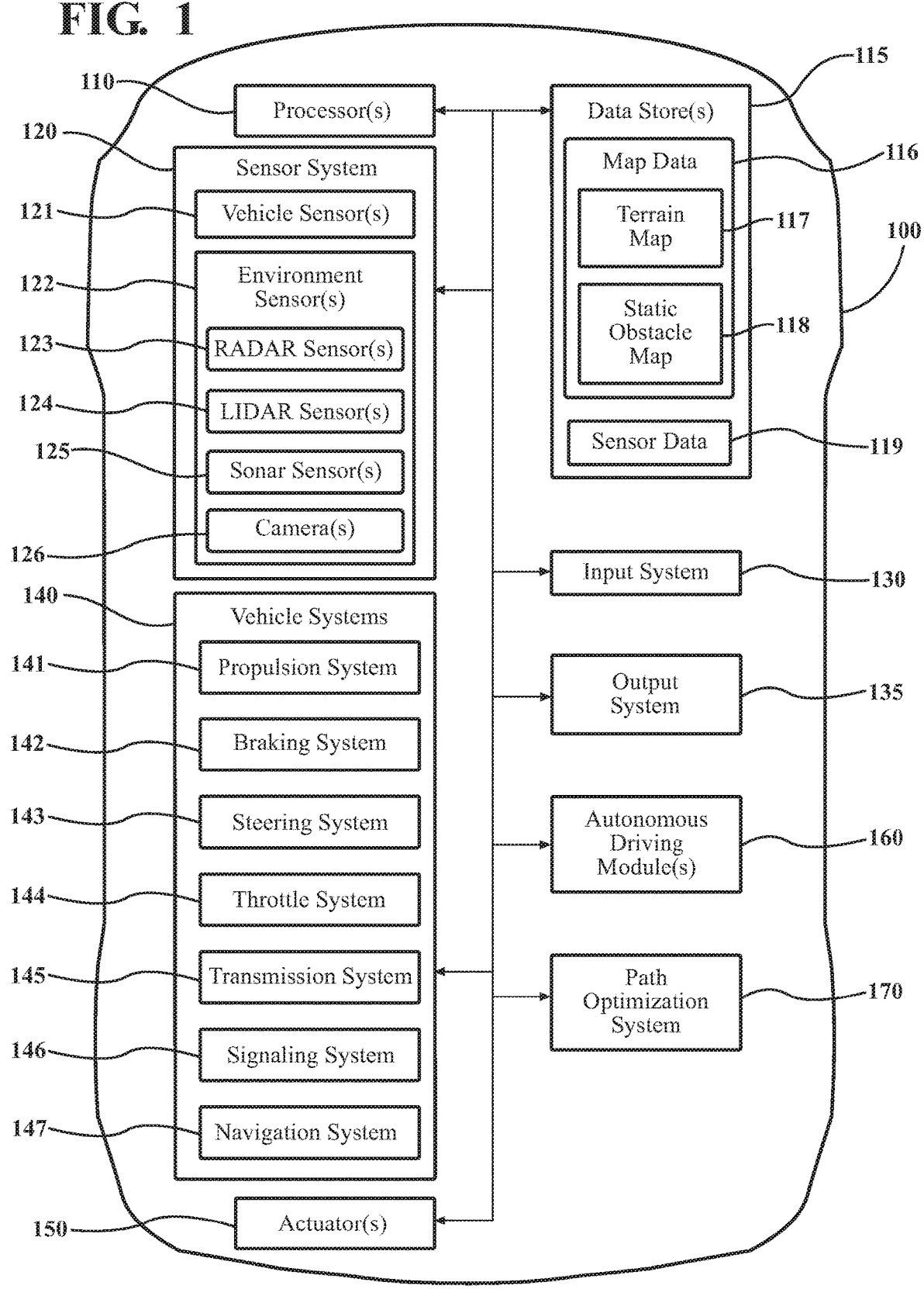
FIG. 1 illustrates one embodiment of a vehicle within which systems and methods disclosed herein may be implemented.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a path optimization system 170 that is implemented to perform methods and other functions as disclosed herein relating to determining optimal paths for obstacle evasion for the vehicle 100. The noted functions and methods will become more apparent with a further discussion of the figures.

Figure 2:
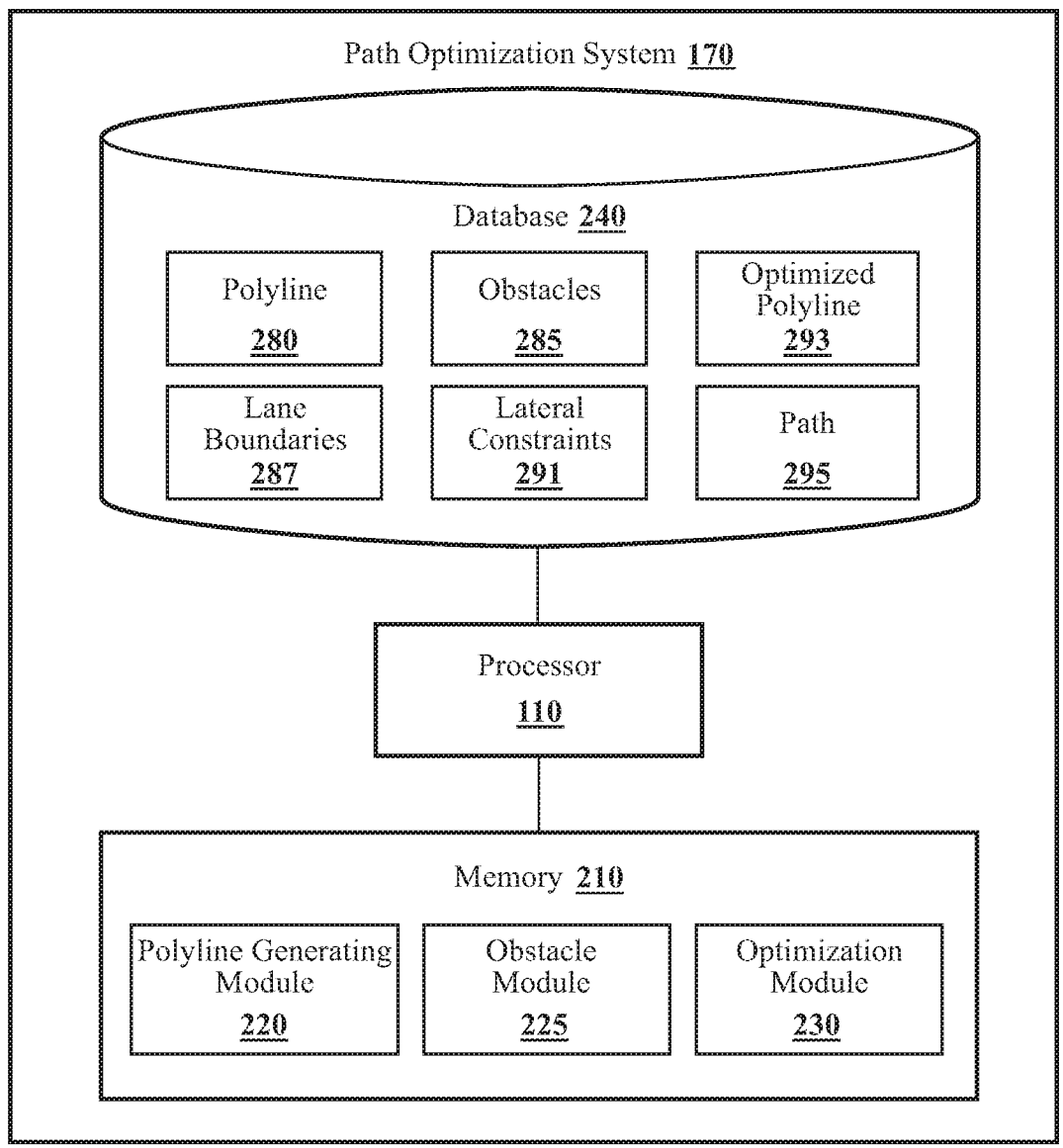
FIG. 2 illustrates one embodiment of a path optimization system.

With reference to FIG. 2, one embodiment of the path optimization system 170 of FIG. 1 is further illustrated. The path optimization system 170 is shown as including a processor 110 from the vehicle 100 of FIG. 1. Accordingly, the processor 110 may be a part of the path optimization system 170, the path optimization system 170 may include a separate processor from the processor 110 of the vehicle 100 or the path optimization system 170 may access the processor 110 through a data bus or another communication path. It should be appreciated, that while the path optimization system 170 is illustrated as being a single contained system, in various embodiments, the path optimization system 170 is a distributed system that is comprised of components that can be provided as a centralized server, a cloud-based service, and so on.

In one embodiment, the path optimization system 170 includes a memory 210 that stores a polyline generating module 220, an obstacle module 225, and an optimization module 230. The memory 210 is a random-access memory (RAM), read-only memory (ROM), a hard-disk drive, a flash memory, or other suitable memory for storing the modules 220, 225, and 230. The modules 220, 225, and 230 are, for example, computer-readable instructions that when executed by the processor 110 cause the processor 110 to perform the various functions disclosed herein. Moreover, as previously noted, in various embodiments, one or more aspects of the path optimization system 170 are implemented as cloud-based services, and so on. Thus, one or more modules of the path optimization system 170 may be located remotely from other components and may be implemented in a distributed manner.

Furthermore, in one embodiment, the path optimization system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 225, and 230 in executing various functions. In one embodiment, the database 240 includes a polyline 280 along with, for example, other information that is used and/or generated by the modules 220, 225 and 230 such as lane boundaries 287, obstacles 285, lateral constraints 291, an optimized polyline 293 and a path 295. Of course, in further embodiments, the various information may be stored within the memory 210 or another suitable location.

The polyline generating module 220 is configured to generate a polyline 280 for a vehicle 100. The polyline 280 may be a series of connected nodes that represents a path that the vehicle 100 is currently following in a lane of a road segment. Typically, the vehicle 100 travels in the center of the lane, and the generated polyline 280 corresponds to the centerline of the lane of the road segment. The nodes of the polyline 280 may be evenly spaced, or alternatively the space been nodes of the polyline 280 may be inconsistently spaced. The number of nodes of the polyline 280 may be fixed by a user or administrator. For example, the nodes may be spaced on the polyline 280 such that there is one node every meter, every five meters, every ten meters, etc. In other embodiments, the node spacing for a polyline 280 may be based on characteristics of the road segment such as how straight or curvy the segment is. For example, a highly curved road segment may use more nodes to adequately capture the curves of the road segment, while a mostly straight road segment may use less nodes.

In some embodiments, the polyline generating module 220, rather than generate the polyline 280, may receive the polyline 280. For example, the polyline generating module 220 may receive the polyline 280 from vehicle systems 140 of the vehicle 100 such as the steering system 143, navigation system 147, or one or more autonomous driving modules 160. The polyline 280 may represent the current path of the vehicle in the road segment. Depending on the embodiment, the polyline generating module 220 may add or remove nodes from the polyline 280.

The polyline 280 may be associated with its own reference frame and coordinate system. Depending on the embodiment, the reference frame for the polyline 280 may be based around the centerline of the lane of the road segment. Each node of the polyline 280 may be associated with a pair of coordinates in the reference frame of the polyline 280. For example, each node may have a local x-axis with an associated x-coordinate that may increase along the driving direction of the lane of the road segment, and may decrease along the opposite direction. Each node may further have a local y-axis with an associated y-coordinate that may increase to the left of the centerline of the lane of the road segment, and may decrease to the right of the centerline of the lane of the road segment. Note that the reference frame of the polyline 280 may be different than a reference frame of the road segment.

The polyline 280 may include a line connecting each of the nodes of the polyline 280. Each line may be made up of a plurality of points. Similar to the nodes, each point of a line may have an x-coordinate and a y-coordinate in the reference frame of the polyline 280.

The obstacle module 225 is configured to detect one or more obstacles 285 in the lane of the road segment. In some embodiments, the obstacle module 225 may detect obstacles 285 using one or more sensors such as the environmental sensors 122 associated with the vehicle 100. The obstacles 285 may include other vehicles, pedestrians, animals, rocks, debris, or any other type of object or thing that may be found in a lane of a road segment. Any method or technique for detecting obstacles 285 in a lane of a road segment may be used.

The obstacle module 225 may be further configured to detect lane boundaries 287. Similar to the obstacles 285, the obstacle module 225 may detect the lane boundaries 287 using the environmental sensors 122 associated with the vehicle 100. The lane boundaries 287 may be the boundaries 287 of the current lane being traveled by the vehicle 100, or the boundaries 287 of the entire road segment being traveled by the vehicle 100. Any method for detecting lane boundaries 287 may be used.

The obstacle module 225 may determine lateral constraints 291 based on the obstacles 285 and lane boundaries 287. In some embodiments, the obstacle module 225 may determine the lateral constraints 291 by projecting the polyline 280 onto the road segment with the detected obstacles 285 and lane boundaries 287. The obstacle module 225 may then determine coordinates of the edges of the obstacles 285 and lane boundaries 287 in the reference frame of the polyline 280. The determined coordinates may be the lateral constraints 291. In some embodiments, the obstacle module 225 may "pad" each of the lateral constraints 291 based on the width of the vehicle 100.

The optimization module 230 may generate an optimized polyline 293 based on the lateral constraints 291 and the coordinates of the points of the polyline 280. In particular, the optimization module 230 may keep as fixed the original x-coordinate (or longitudinal coordinate) of each point, and may generate a new y-coordinate (or lateral coordinate) for some or all of the points of the polyline based on the lateral constraints 291.

In some embodiments, the optimization module 230 may generate y-coordinates for each point using a special cost function such as a quadratic program. The points with the revised y-coordinates may be output by the optimization module 230 as the optimized polyline 293. An example quadratic program is the quadratic program illustrated below:

$$\min_{y_0, y_1, \ldots, y_n} \sum_{i=1}^{n-1} ((y_{i+1} - y_i)/(x_{i+1} - x_i) - (y_i - y_{i-1})/(x_i - x_{i-1}))^2 + w \sum_{i=0}^{n-1} (y_{i+1} - y_i)^2$$

The quadratic program may be subject to the following:

$$y_{i,min} \leq y_i \leq y_{i,max}, \text{ for } i=0,1,\ldots,n$$

$$-dy_{max} \leq y_i - y_{i-1} \leq dy_{max}, \text{ for } i=1,2,\ldots,n\text{-}n_{final\text{-}points}$$

$$y_i - y_{n\text{-}n_{final\text{-}points}} = 0, \text{ for } i=n\text{-}n_{final\text{-}points}+1,\ldots,n$$

For each point in the original polyline 280, the above quadratic program works by selecting the y-coordinate that results in the minimum value of the cost function. The y-coordinate for a point may be selected from a set of possible y-coordinates based on the lateral constraints 291. For example, the quadratic program may not select a y-coordinate that will result in a collision of the vehicle 100 with either an obstacle 285 or lane boundary 287.

The second term in the quadratic program is a regularization term, where a parameter/weight w enforces straightness of the output path (the higher the parameter, the less smooth the output path and the shorter the overall length of the output path (i.e., the straighter the output path)). The value of w used by the quadratic program may be set by a user or administrator.

The variable $n_{final-points}$ is the number of final points in the optimized polyline 293 that are aligned/straight (i.e., having the same y-coordinates), which may be used by the optimization module 230 to select the optimized polyline 293 from among other possible polylines.

The parameter $dy_{max}$ is a maximum difference in the y-coordinate between two consecutive points. As may be appreciated, a large difference in the y-coordinates may result in a sharp turn for a vehicle 100 following a path generated according to the optimized polyline 293. The parameter $dy_{max}$ may be set by a user or administrator.

In some embodiments, the optimization module 230, when generating the optimized polyline 293, may fix the first few points (e.g., i=0, 1, 2, 3) of the optimized polyline 293. The particular y-coordinate selected to fix the first few points may be based on a current heading of the vehicle 100, for example.

The optimization module 230 may use the optimized polyline 293 to generate a path 295 for the vehicle 100. The optimization module 230 may provide the path 295 to one or more autonomous driving modules 160 to control the vehicle 100 in the road segment. Alternatively or additionally, the optimization module 230 may provide the path 295 to one or more vehicle systems 140 such as the navigation system 147 and the steering system 143, for example. The path 295 may be used by the vehicle 100 to avoid the obstacles 285 in the road segment.

In one implementation, the optimization module 230 may generate the path 295 from the optimized polyline 293 may translate the coordinates of the points/nodes of the optimized polyline 293 from the reference frame of the optimized polyline 293 into a reference frame of the road segment. Any method for translating coordinates between reference frames may be used. Alternatively or additionally, the optimization module 230 may provide the optimized polyline 293 as the path 295 without any further translation.

Figure 3:
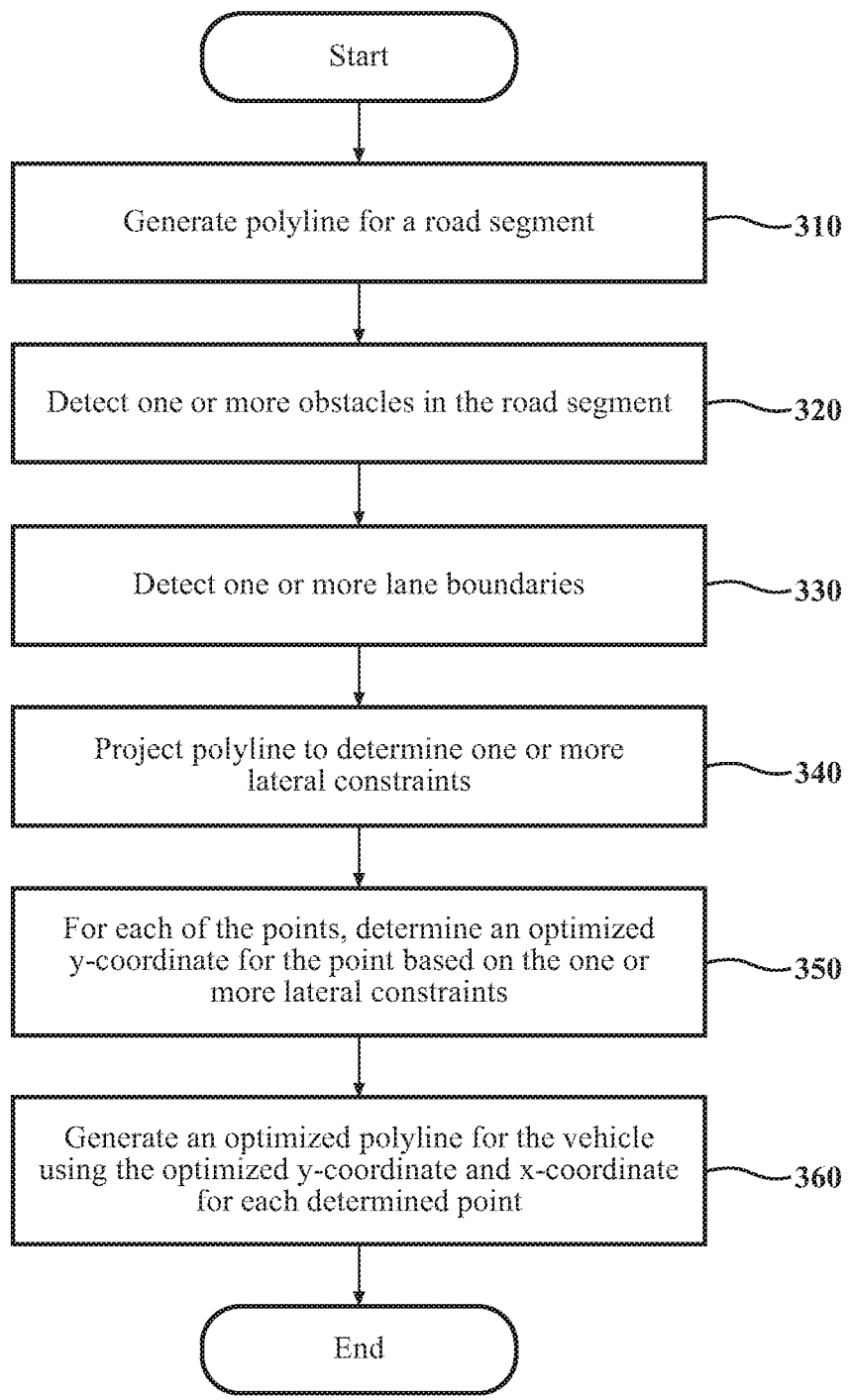
FIG. 3 illustrates a flowchart of a method that is associated with generating an optimized polyline in view of obstacles and lane boundaries.

Additional aspects of generating an optimized polyline 293 will be discussed in relation to FIG. 3. FIG. 3 illustrates a flowchart of a method 300 that is associated with generating an optimized polyline 293 in view of obstacles 285 and lane boundaries 287. The method 300 will be discussed from the perspective of the path optimization system 170 of FIGS. 1 and 2. While the method 300 is discussed in combination with the path optimization system 170, it should be appreciated that the method 300 is not limited to being implemented within the path optimization system 170 but is instead one example of a system that may implement the method 300.

At 310, the polyline generating module 220 generates a polyline 280 for a road segment. The polyline 280 may be generated from a path currently being traveled by a vehicle 100 in a lane of the road segment. The polyline 280 may follow a centerline of the lane of the road segment. The polyline 280 may have a plurality of nodes. Depending on the embodiment, the nodes may be evenly spaced along the polyline 280 (e.g., one node per meter). If there are too few or too many nodes in the polyline 280, the polyline generating module 220 may add or remove nodes from the polyline 280. The desired number of nodes or node density for the polyline 280 may be set by a user or administrator. The polyline 280 may further include a line connecting each node, and each line may be made up of a plurality of points.

Figure 5:
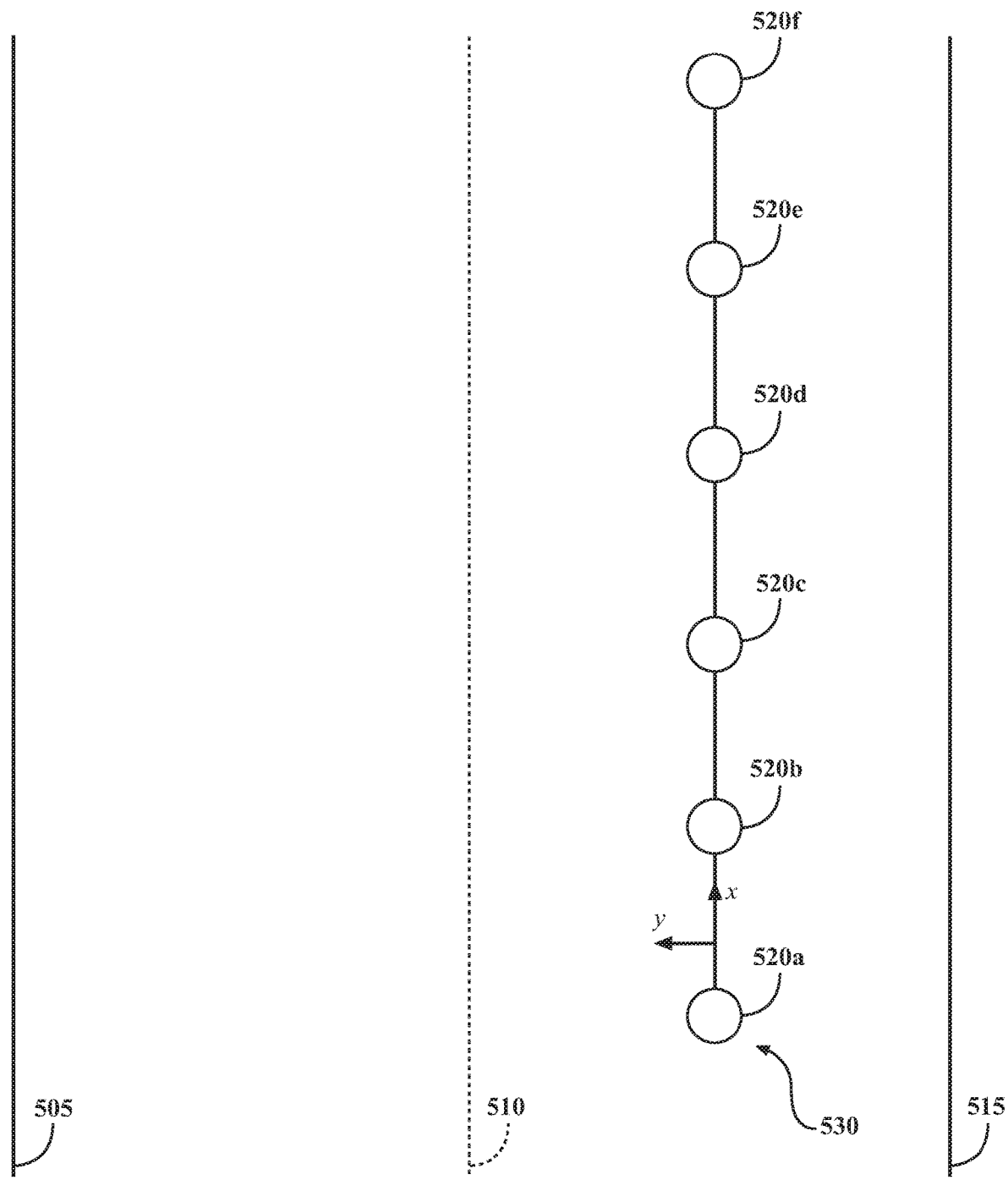
FIG. 5 illustrates an example polyline.

An example polyline 530 is illustrated in FIG. 5. The polyline 530 is made up of a plurality of nodes 520 (i.e., the nodes 520a-520f). As shown, the polyline 530 is displayed in a lane of a road segment. The polyline 530 is located in approximately the centerline of a right lane of the road segment. The road segment includes a left lane boundary 505, a center boundary 510, and a right lane boundary 515. Each of the nodes 520a-520f is connected by a line.

As described above, each of the nodes 520 may have a first coordinate and a second coordinate using a reference frame of the polyline 530. The first coordinate associated with each node 520 may be the x-coordinate and may increase in the direction that the vehicle 100 travels in the lane of the road segment. Accordingly, in the example shown, the node 520a has the lowest x-coordinate and the node 520f has the highest x-coordinate.

The second coordinate associated with each node 520 may be the y-coordinate and may increase in the direction of the right lane boundary 515, and may decrease in the direction of the left lane boundary 505 (or vice-versa). In the example shown, each of the nodes 520 has approximately the same y-coordinate value.

Returning to FIG. 3, at 320, the obstacle module 225 detects one or more obstacles 285 in the road segment. The obstacle module 225 may detect the one or more obstacles 285 in the road segment using one or more environmental sensors 122 of the sensor system 120 of the vehicle 100. Example environmental sensors 122 include a camera 126. Other environmental sensors 122 may be used.

At 330, the obstacle module 225 detects one or more lane boundaries 287. The obstacle module 225 may similarly detect the lane boundaries 287 of the road segment using one or more environmental sensors 122 of the sensor system 120 of the vehicle 100.

Figure 6:
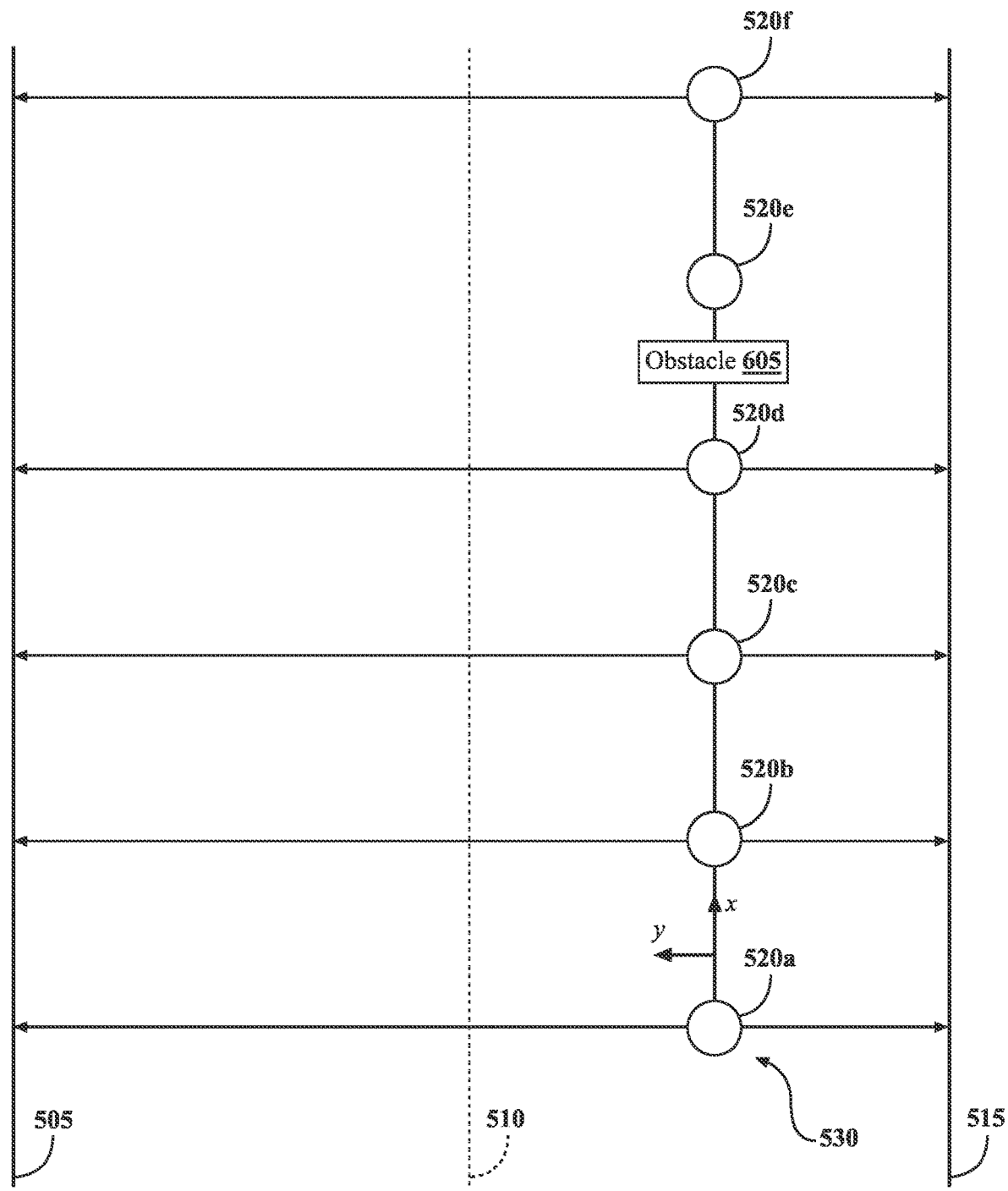
FIG. 6 illustrates an example polyline including one or more obstacles.

Continuing to FIG. 6, an obstacle 605 has been detected in the road segment. In the example shown, the obstacle 605 lies between the node 520d and the node 520e of the polyline 530. Moreover, the lane boundaries 505 and 515 have been detected as indicated by the arrows connecting each of the nodes 520 to the lane boundaries 505 and 515.

Returning to FIG. 3, at 340, the obstacle module 225 projects the polyline 280 into the road segment to determine one or more lateral constraints 291. The obstacle module 225 may determine the lateral constraints 291 by translating the boundaries and edges of the one or more obstacles 285 and lane boundaries 287 into the reference frame, or coordinate system, of the polyline 280. In addition, the obstacle module 225 may pad or adjust the lateral constraints 291 to account for the width of the vehicle 100. Any method for determining lateral constraints 291 from obstacles 285 and lane boundaries 287 may be used.

Figure 7:
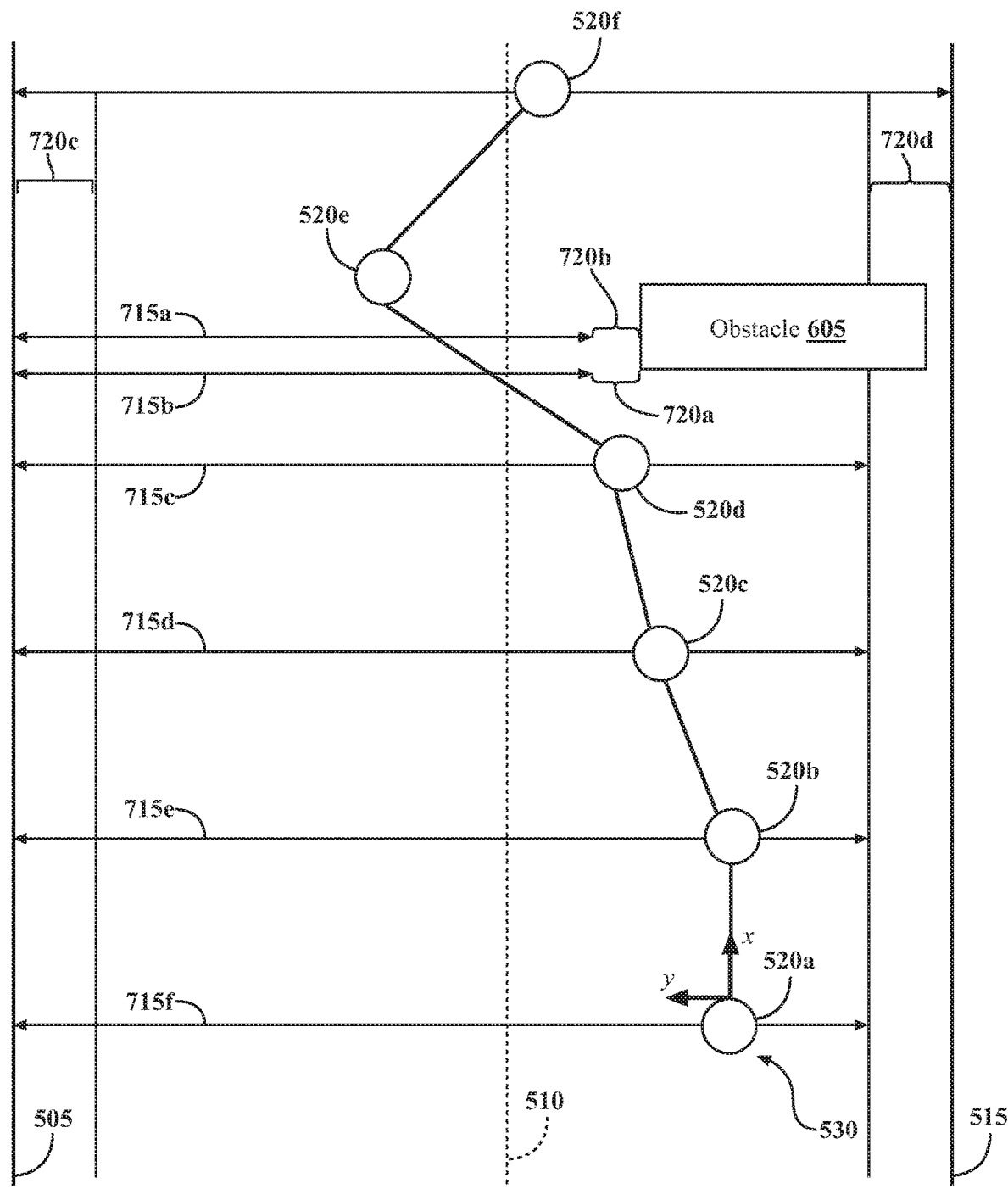
FIG. 7 illustrates an example optimized polyline including one or more lateral constraints.

Continuing to FIG. 7, the generated lateral constraints 715 (i.e., the arrows 715a-f) are illustrated by using double sided arrows. Each lateral constraint 715 represents a permissible set of y-coordinates for the vehicle at the x-coordinate corresponding to the lateral constraint 715. As shown, each lateral constraint 715 is adjusted by an offset 720 (i.e., the offsets 720a-d) that is based on the width of the vehicle 100.

For example, the obstacle 605 is associated with the lateral constraints 715a and 715b. The lateral constraints 715a and 715b include the y-coordinates that the vehicle 100 can use to pass the obstacle 605 while also avoiding the left road boundary 505. The points of the polyline 530 that intersect with the obstacle 605 are the points of the polyline 530 that connect the nodes 520d and 520e and pass through the obstacle 605.

Returning to FIG. 3, at 350, the optimization module 230 module determines an optimized y-coordinate for each point of the polyline 280. The optimized y-coordinate may be optimized by the optimization module 230 using the associated first coordinate (i.e., x-coordinate) based on the lateral constraints 291 and a cost function. The optimized y-coordinate may be a y-coordinate that does not intersect or overlap with any of the obstacles 285 in accordance with the lateral constraints 291. Depending on the embodiment, the cost function may be a quadratic program, such as the quadratic program described above, for example. Other cost functions may be used.

At 360, the optimization module 230 generates an optimized polyline 293 for the vehicle 100. The optimization module 230 may generate the optimized polyline 293 using the x-coordinates from the original polyline 280 and the optimized y-coordinates generated at 350. Returning to FIG. 7, the polyline 530 is the optimized polyline 293 that avoids the obstacle 605.

Figure 4:
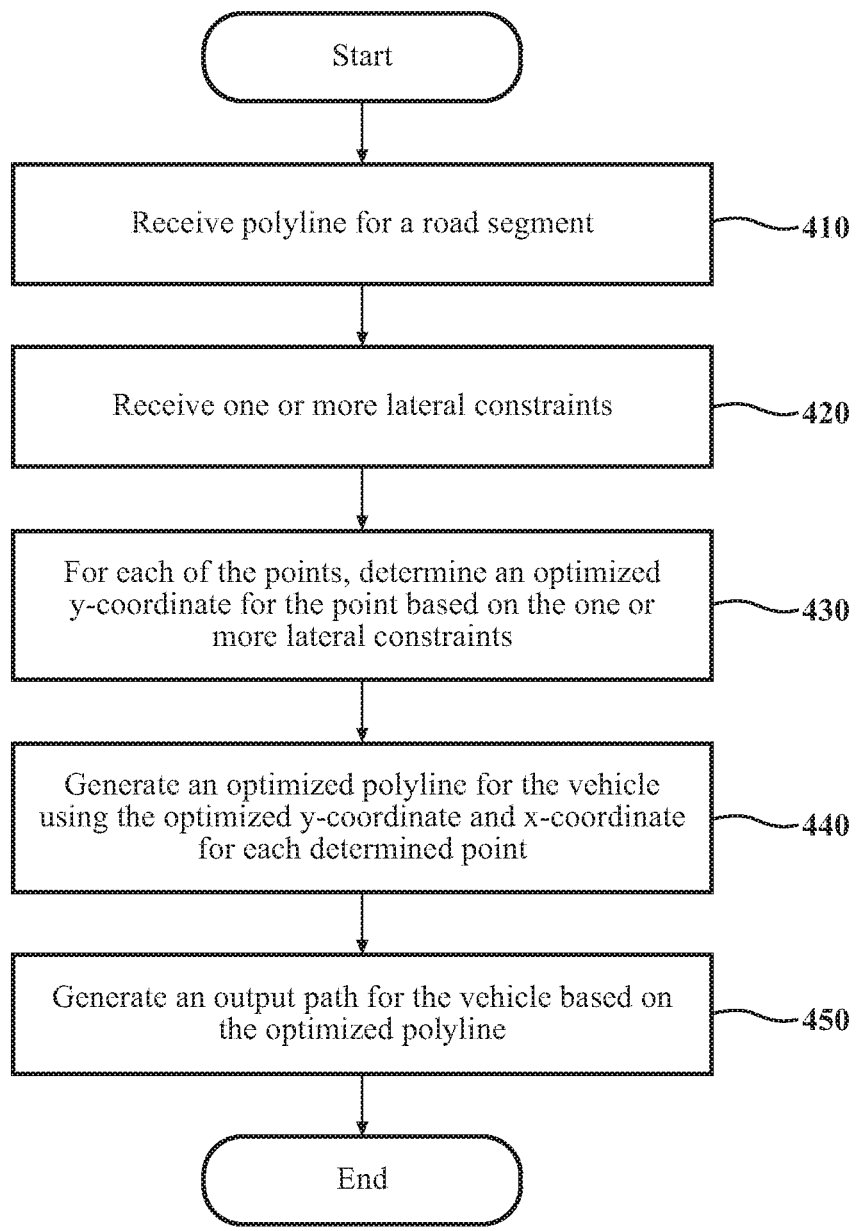
FIG. 4 illustrates a flowchart of a method that is associated with generating an optimized path for a vehicle that avoids obstacles.

Additional aspects of generating an optimized polyline 293 will be discussed in relation to FIG. 4. FIG. 4 illustrates a flowchart of a method 400 that is associated with generating an optimized path 295 for a vehicle 100 that avoids obstacles 285. The method 400 will be discussed from the perspective of the path optimization system 170 of FIGS. 1 and 2. While the method 400 is discussed in combination with the path optimization system 170, it should be appreciated that the method 400 is not limited to being implemented within the path optimization system 170 but is instead one example of a system that may implement the method 400.

At 410, the polyline generating module 220 receives a polyline 280 for a road segment. The polyline 280 may be generated from a path currently being traveled by a vehicle 100 in a lane of the road segment. The polyline 280 may follow a centerline of the lane of the road segment. The polyline 280 may have a plurality of nodes. As described above, each of the nodes may have a first coordinate (i.e., x-coordinate) and a second coordinate (i.e., y-coordinate) using a reference frame of the polyline 280.

At 420, the obstacle module 225 receives one or more lateral constraints 291. Each lateral constraint 291 may correspond to an obstacle 285 in the road segment or a lane boundary 287 of the road segment. Each lateral constraint 291 represents a permissible set of y-coordinates for the vehicle 100 at the x-coordinate corresponding to the lateral constraint 291. In some embodiments, each lateral constraint 291 may be expressed in the reference frame of the polyline 280. If the lateral constraints 291 use a different reference frame (e.g., a reference frame of the road segment), then the obstacle module 225 may translate each lateral constraint 291 into the reference frame of the polyline 280. The lateral constraints 291 may have been generated by projecting the polyline 280 into the road segment.

At 430, the optimization module 230 module determines an optimized second coordinate for each point of the polyline 280. The optimized second coordinate may be a y-coordinate and may be optimized by the optimization module 230 using the associated first coordinate (i.e., x-coordinate) based on the lateral constraints 291 and a cost function. Depending on the embodiment, the cost function may be a quadratic program.

At 440, the optimization module 230 generates an optimized polyline 293 for the vehicle 100. The optimization module 230 may generate the optimized polyline 293 using the x-coordinates from the points of the original polyline 280 and the optimized y-coordinates generated at 440.

At 450, the optimization module 230 generates an optimized path 295 for the vehicle 100. The optimization module 230 may generate the optimal path 295 for the vehicle 100 by translating the optimized polyline 293 into the reference frame of the road segment or another reference frame expected by the vehicle 100. The optimized path 295 may then be used by modules of the vehicle 100 to avoid the obstacles 285 and/or lane boundaries 287 associated with the lateral constraints 291 received at 420. The modules may include one or more autonomous driving modules 160, for example.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the path optimization system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the path optimization system 170, and/or the autonomous driving module(s) 160 may control some or all of these vehicle systems 140 and, thus, may be partially or fully autonomous.

The processor(s) 110, the path optimization system 170, and/or the autonomous driving module(s) 160 can be operatively connected to communicate with the various vehicle systems 140 and/or individual components thereof. For example, returning to FIG. 1, the processor(s) 110, the path optimization system 170, and/or the autonomous driving module(s) 160 can be in communication to send and/or receive information from the various vehicle systems 140 to control the movement, speed, maneuvering, heading, direction, etc. of the vehicle 100. The processor(s) 110, the path optimization system 170, and/or the autonomous driving module(s) 160 may control some or all of these vehicle systems 140.

The processor(s) 110, the path optimization system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the path optimization system 170, and/or the autonomous driving module(s) 160 can control the direction and/or speed of the vehicle 100. The processor(s) 110, the path optimization system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the path optimization system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A vehicle having a path optimization system for optimizing a polyline for obstacle evasion for the vehicle, comprising:
   vehicle systems including one or more of a propulsion system, a braking system, a steering system, a throttle system, a transmission system, a signaling system, or a navigation system;
   one or more processors; and
   a memory communicably coupled to the one or more processors and storing the path optimization system, the path optimization system having:
      a polyline generating module including instructions that when executed by the one or more processors cause the one or more processors to generate a polyline along a road segment, wherein the polyline comprises a plurality of nodes wherein each node includes an x-coordinate and a y-coordinate using a reference frame of the polyline;
      an obstacle module including instructions that when executed by the one or more processors cause the one or more processors to:
         detect one or more obstacles in the road segment; and
         project the polyline into the road segment with the one or more obstacles to determine one or more lateral constraints for an output path; and
      an optimization module including instructions that when executed by the one or more processors cause the one or more processors to:
         for each point of a plurality of points of the polyline, determine an optimized y-coordinate for the point based on a minimum value of a cost function of possible y-coordinates based on the one or more lateral constraints, wherein the each point includes an x-coordinate and a y-coordinate using the reference frame of the polyline;
         generate a plurality of polylines for the vehicle using the optimized y-coordinate and the x-coordinate for the each point; and
         select, from the plurality of polylines, an optimized polyline based on a count of optimized y-coordinates that have a same value,
   wherein the one or more processors are configured to use the optimized polyline to cause at least one of the vehicle systems to control a movement of the vehicle to avoid at least one of the lane boundary or at least one of the one or more obstacles.

2. The system of claim 1, wherein the vehicle is an autonomous vehicle or a semi-autonomous vehicle.

3. The system of claim 1, wherein the x-coordinate for each point is a fixed coordinate.

4. The system of claim 1, wherein the cost function comprises a quadratic program.

5. The system of claim 1, wherein the instructions that cause the one or more processors to generate the polyline along the road segment comprise instructions that cause the one or more processors to generate the polyline along a centerline of the road segment.

6. The system of claim 1, wherein the obstacle module further includes instructions that when executed by the one or more processors cause the one or more processors to detect one or more lane boundaries of the road segment.

7. The system of claim 6, wherein the instructions that cause the one or more processors to project the polyline into the road segment with the one or more obstacles comprise instructions that cause the one or more processors to project the polyline into the road segment with the one or more obstacles and the one or more lane boundaries to determine the one or more lateral constraints.

8. The system of claim 1, wherein the optimization module further includes instructions that when executed by the one or more processors cause the one or more processors to generate the output path for the vehicle in the road segment from the optimized polyline, wherein the output path uses a reference frame of the road segment.

9. A method for generating an optimized polyline for obstacle evasion for a vehicle, the method comprising:
   receiving, by a processor, a polyline for a road segment, wherein the polyline comprises a plurality of nodes wherein each node includes an x-coordinate and a y-coordinate using a reference frame of the polyline;
   receiving, by the processor, indications of one or more obstacles in the road segment;
   receiving, by the processor, one or more lateral constraints;
   for each point of a plurality of points of the polyline, determining, by the processor, an optimized y-coordinate for the point based on a minimum value of a cost function of possible y-coordinates based on the one or more lateral constraints, wherein the each point includes the x-coordinate and the y-coordinate using the reference frame of the polyline;
   generating, by the processor, a plurality of polylines for the vehicle using the optimized y-coordinate and the x-coordinate for the each point, point; and
   selecting, from the plurality of polylines, an optimized polyline based on a count of optimized y-coordinates that have a same value,
   wherein the processor is configured to use the optimized polyline to cause at least one vehicle system to control a movement of the vehicle to avoid at least one of the lane boundary or at least one of the one or more obstacles,
   wherein the at least one vehicle system includes one or more of a propulsion system, a braking system, a steering system, a throttle system, a transmission system, a signaling system, or a navigation system, and
   wherein the processor and the at least one vehicle system are disposed on the vehicle.

10. The method of claim 9, wherein the vehicle is an autonomous vehicle or a semi-autonomous vehicle.

11. The method of claim 9, wherein the x-coordinate for the each point is a fixed coordinate.

12. The method of claim 9, wherein the cost function comprises a quadratic program.

13. The method of claim 9, wherein the polyline is along a centerline of the road segment.

14. The method of claim 9, further comprising generating, by the processor, a path for the vehicle in the road segment from the optimized polyline, wherein the path uses a reference frame of the road segment.

15. A non-transitory computer-readable medium for generating an optimized polyline for a vehicle that avoids obstacles and including instructions that when executed by one or more processors, disposed on the vehicle, cause the one or more processors to:
   receive a polyline for a road segment, wherein the polyline comprises a plurality of nodes, and further wherein each node includes an x-coordinate and a y-coordinate using a reference frame of the polyline;
detect one or more obstacles in the road segment;
detect one or more lane boundaries in the road segment;
project the polyline into the road segment with the one or more obstacles to determine one or more lateral constraints for an output path, at least one of the one or more lateral constraints being based on an edge of a lane boundary, the edge of the lane boundary being located between the vehicle and the one or more obstacles;
for each point of a plurality of points of the polyline, determine an optimized y-coordinate for the each point based on the one or more lateral constraints, wherein the each point includes the x-coordinate and the y-coordinate using the reference frame of the polyline;
generate a plurality of polylines for the vehicle using the optimized y-coordinate and the x-coordinate for the each point; and
select, from the plurality of polylines, an optimized polyline based on a count of optimized y-coordinates that have a same value,
wherein the one or more processors are configured to use the optimized polyline to cause at least one vehicle system, disposed on the vehicle, to control a movement of the vehicle to avoid at least one of the lane boundary or at least one of the one or more obstacles, and
wherein the at least one vehicle system includes one or more of a propulsion system, a braking system, a steering system, a throttle system, a transmission system, a signaling system, or a navigation system.

16. The non-transitory computer-readable medium of claim 15, wherein the vehicle is an autonomous vehicle or a semi-autonomous vehicle.

17. The non-transitory computer-readable medium of claim 15, wherein the x-coordinate for the each point is a fixed coordinate.

18. The non-transitory computer-readable medium of claim 15, wherein the cost function comprises a quadratic program.

19. The non-transitory computer-readable medium of claim 15, wherein the polyline is along a centerline of the road segment.

20. The non-transitory computer-readable medium of claim 15, wherein the instructions further includes instructions that cause the one or more processors to generate the output path for the vehicle in the road segment from the optimized polyline, wherein the output path uses a reference frame of the road segment.

21. A vehicle, comprising:
a vehicle control system;
a processor; and
a memory storing:
an obstacle module including instructions that cause the processor to project a polyline to determine, for a path, a lateral constraint; and
an optimization module including instructions that cause the processor to:
generate a plurality of polylines based on a minimum value of a cost function applied to coordinates of the polyline; and
select, from the plurality of polylines, an optimized polyline based on a count of optimized y-coordinates that have a same value, the optimized y-coordinates determined from the minimum value of the cost function,
wherein the processor is configured to use the optimized polyline to cause the vehicle control system to avoid the lane boundary or the obstacle.

* * * * *

UNITED STATES PATENT AND TRADEMARK OFFICE
CERTIFICATE OF CORRECTION

PATENT NO. : 11,161,501 B2
APPLICATION NO. : 16/241027
DATED : November 2, 2021
INVENTOR(S) : Robert A. E. Zidek It is certified that error appears in the above-identified patent and that said Letters Patent is hereby corrected as shown below:

In the Claims

Claim 9, Line 20: delete "point, point;" and insert --point;--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*